US008473654B2

(12) United States Patent
Dickens et al.

(10) Patent No.: US 8,473,654 B2
(45) Date of Patent: Jun. 25, 2013

(54) COMPUTER INPUT SWITCHING DEVICE

(75) Inventors: Nigel Dickens, Cambridge (GB); Robert Thornburrow, Cambridge (GB)

(73) Assignee: Adder Technology Limited, Cambridge (GB)

( * ) Notice: Subject to any disclaimer, the term of this patent is extended or adjusted under 35 U.S.C. 154(b) by 0 days.

(21) Appl. No.: 12/815,277

(22) Filed: Jun. 14, 2010

(65) Prior Publication Data

US 2011/0047306 A1  Feb. 24, 2011

(30) Foreign Application Priority Data

Jun. 15, 2009 (GB) .................................. 0910186.6
Dec. 23, 2009 (GB) .................................. 0922477.5

(51) Int. Cl.
*G06F 13/12* (2006.01)
*G06F 3/033* (2006.01)
*G09G 5/08* (2006.01)

(52) U.S. Cl.
USPC ........................................... 710/73; 345/157

(58) Field of Classification Search
None
See application file for complete search history.

(56) References Cited

U.S. PATENT DOCUMENTS

| | | | |
|---|---|---|---|
| 2004/0015980 A1 | 1/2004 | Rowen et al. | |
| 2005/0190148 A1* | 9/2005 | Fujita | 345/156 |
| 2006/0230110 A1 | 10/2006 | VanHarlingen et al. | |
| 2007/0022234 A1 | 1/2007 | Yang | |
| 2008/0048975 A1* | 2/2008 | Leibow | 345/156 |
| 2008/0055239 A1* | 3/2008 | Garibaldi et al. | 345/156 |
| 2009/0083453 A1* | 3/2009 | Hsueh et al. | 710/36 |
| 2010/0180055 A1* | 7/2010 | Lyon et al. | 710/62 |

FOREIGN PATENT DOCUMENTS

| | | |
|---|---|---|
| EP | 1164461 | 12/2001 |
| GB | 2 427 530 | 6/2007 |

OTHER PUBLICATIONS

Search Report dated Sep. 27, 2010 from Application No. GB1009912.5.

* cited by examiner

*Primary Examiner* — Ilwoo Park
(74) *Attorney, Agent, or Firm* — Beyer Law Group LLP (57) ABSTRACT

A switching device for automatically sharing a pointing input device between a plurality of computers is described. The switching device includes an input for receiving relative pointer position data from the pointing input device and a plurality of outputs, each connectable to a respective one of a plurality of computers. A controller receives the input relative position data and converts the relative pointer position data to absolute pointer position data. Which of the plurality of computers to route input data to is determined based on the absolute pointer position data. Input data is routed to one of the plurality of computers so that a cursor position on a display device of the computer can be controlled by the pointing input device. Switching apparatus is also described that combines video data from the plurality of computers for display on a single display device and the cursor position on a portion of the display device corresponding to a one of the computers is controlled by the input pointing device.

32 Claims, 5 Drawing Sheets

COMPUTER INPUT SWITCHING DEVICE

BACKGROUND OF THE INVENTION

The present invention relates to a device which can be used to control a plurality of computers and in particular to a device which can be used to allow a pointer input device to be used to control a plurality of different computers based on the position of a pointer on the display device or devices of the computers.

Figure 1:
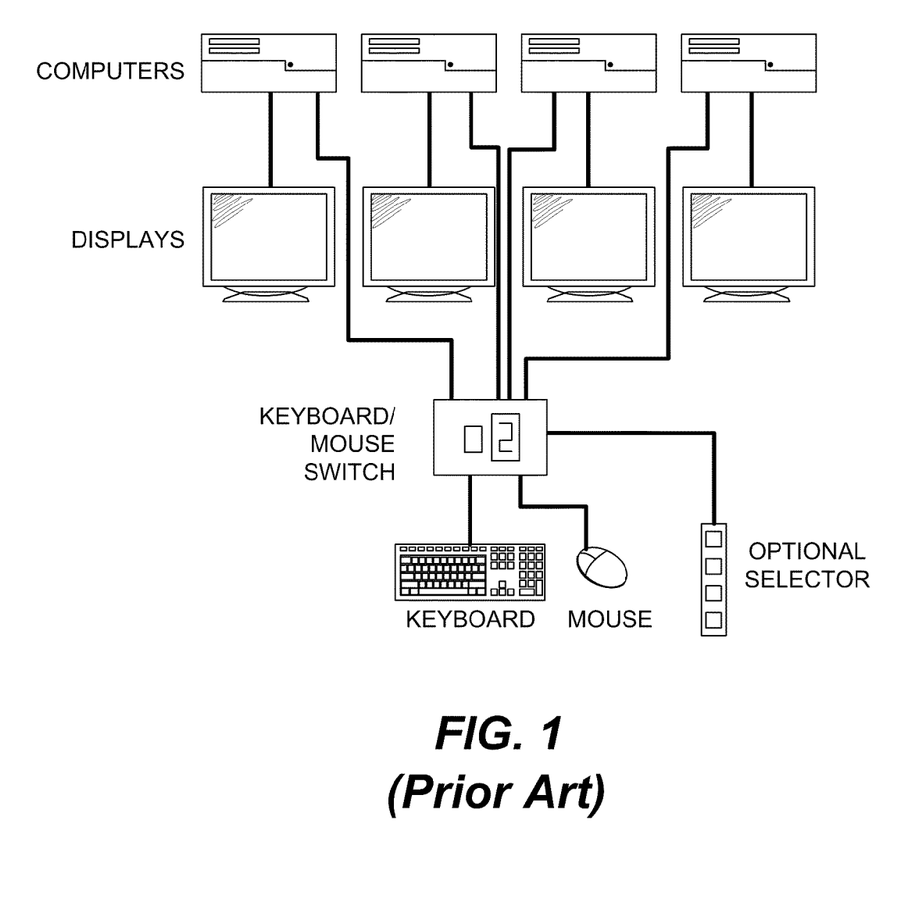
FIG. 1 shows a schematic block diagram of a computer system including a known keyboard and mouse switch.

There are a number of scenarios in which users have multiple computer screens or display devices which display information from a number of different computers. For example, in financial trading and control room environments it is common for users to monitor information on several screens that are arranged around their workspace. Very often these screens are fed from different computer systems and the user will typically need to interact with these different computers from time to time. In such cases, it is usually undesirable or impractical for the user to have a dedicated keyboard and mouse for every computer system and so a KM (Keyboard, Mouse) switch is commonly employed to enable a single keyboard and mouse to be switched between the computers as illustrated in FIG. 1.

Suitable KM switches, such as the Adder TS4 supplied by Adder Technology Limited, are usually switchable using specially assigned keyboard hotkey combinations and may sometimes also be switched using combinations of buttons on the mouse. Some users prefer a dedicated keypad to select the computer, such as the Adder RC4 provided by Adder Technology Limited. Using such equipment, the user may select the computer that they wish to control with the keyboard and mouse. A display on the KM switch confirms the selected computer, although this is often superfluous because the user can identify the selected system simply by observing which screen the mouse pointer is moving on.

Although such KM switches provide a useable solution to the problem of sharing a keyboard and mouse between multiple computers, the switching still needs to be controlled by the user and this is inconvenient for users who wish to frequently switch between computers. For convenience, it would be preferable for the switching to occur automatically in a manner that mimics the operation of a single computer with multiple connected monitors.

In this case of a single computer with a multiple monitor extended desktop, the user defines the orientation of their screens and the system automatically moves the mouse cursor on to the next screen as it flows over the edge of the previous adjacent screen. Such single computer, multiple monitor, extended desktop systems are generally known in the art.

However, it has been found by the Applicant that implementing the same intuitive operation across multiple computers is challenging because computer mouse interfaces do not usually provide information about the screen position of the mouse pointer. Further, standard style mice usually provide only relative movement data. Furthermore, computers often apply various different acceleration schemes to improve the mouse action. These issues mean that it is has not been practical on existing KM switches to determine the position of the mouse pointer on the screen by examining the mouse movement data that is sent to the computer. Consequently existing KM switches have not been able to implement automatic switching based on the mouse pointer moving across the edge of the screen because they are not able to determine the position of the mouse pointer reliably.

Software systems exist that enable automated switching of HID devices based on the mouse pointer position. An example of such a system is the open source software product called Synergy that may be downloaded from the Internet. Synergy works by connecting the keyboard and mouse to one computer and loading master software on this computer and slave software on each of the other computers that are to be controlled. The master and slave software programs communicate together over a common network that links the computers. The software is able to find the position of the mouse pointer from each computer's operating system and uses this information to route the keyboard and mouse data between the computers as required using the common network connection. When the keyboard and mouse focus is to be switched from the master computer to a slave computer, the master software intercepts the keyboard and mouse data and re-routes it via the network to a selected slave software program where it is utilised to control the slave computer. The basic keyboard and mouse switching action therefore mimics the operation of a KM switch.

Although useable, such software systems have the drawback that special software needs to be loaded onto each computer. This software is effectively remote control software and loading such software onto computers commonly breaks security rules which are often strict in various environments, such as financial and control room environments. It is therefore preferable not to use software to implement the automated switching of HID devices based on the mouse pointer position.

GB-2427530 describes a switching device including a switch controller which is used to control movement of a pointer on a display connected to a host computer system which currently has focus. Each host computer system includes a custom software service which has to be installed on the host computer system and which monitors the position of the pointed via the system mouse controller when the host has focus and then signals the switching device to change focus to another of the host computer systems when the pointer is moved in a predetermined pattern.

There are a number of drawbacks to the approach of installing software on each host computer system so that the host computer systems can communicate back to the switching device. Software drivers need to be loaded onto each of the host computer systems, but it is not always convenient or possible to install software onto computer systems (for example if the computers are physically remote or if the user does not have system administrator credentials to do so). Further, different versions of the software drivers need to be produced to support each different operating system and also to support new operating systems as they are introduced. Therefore, there are benefits in being able to provide a less intrusive or non-invasive approach which is more operating system independent.

BRIEF DESCRIPTION OF THE INVENTION

The present invention provides a device which can be used to automatically switch a pointer input device between multiple computers based on the position of the pointer or cursor. To achieve this, the device can calculate the position of the pointer on the connected computers using the mouse pointer data that it has sent to the computers.

According to a first aspect of the invention, there is provided a device for sharing a pointing input device between a plurality of computers. The device can include an input for receiving relative pointer position data from the pointing input device, a plurality of outputs, each connectable to a respective one of a plurality of computers to supply input data to a one of the plurality of computers, and a controller. The controller can be configured or programmed to: receive from the input relative position data from the pointing device and convert the relative pointer position data to absolute pointer position data; determine which of the plurality of computers to route input data to based on the absolute pointer position data; and route input data to the determined one of the plurality of computers so that a cursor position on a display device of the determined one of the plurality of computers can be controlled by the pointing input device.

By processing the pointer data and presenting it to the computers as absolute pointer information, the invention is able to reliably determine the position of the mouse pointer on the target computer's screen. This in turn enables the invention to switch HID devices between computers automatically as the pointer, or cursor, moves across the edge of the computer screen. The overall result is an intuitive user experience whereby a pointer input device, such as a mouse, can be used to move a pointer or cursor gracefully across the screens of different computers. A keyboard can also follow the pointer device focus, if it is desirable to provide both a keyboard and pointer device.

Unlike other systems, the invention does not require specialist software to be loaded onto the computers. The invention is particularly suitable for use in control room and financial trading applications where a user is seated in front of an array of screens that are being fed from different computers.

The absolute pointer position data can be referenced relative to a fixed origin.

Each of the plurality of outputs can be a serial output or interface, such as a universal serial bus (USB). The input can be a serial input or interface, such as a universal serial bus (USB).

The pointing input device can be any of a variety of pointing input devices used to control the position of a pointer or cursor on a screen, such as a trackball, track pad, joystick or preferably a mouse.

The controller can be further configured to use pointer scaling data and/or pointer acceleration data in converting the relative pointer position data to the absolute pointer position data. This can help to mimic the pointer action on a display device that a user prefers and that would have occurred if the input data had been applied to the computer as relative movement data.

The input can also receive keyboard input data. The controller can be further configured automatically to route keyboard input data as input data to the determined one of the computers at the same time as input data from the pointing device.

The controller can be further configured to determine which of the plurality of computers to route input data to based on whether the absolute pointer position data corresponds to a pointer position on a display device of a computer different to a currently controlled computer.

The controller can be further configured to determine which of the plurality of computers to route input data to based on whether the absolute pointer position data corresponds to a pointer position on a display device of a computer different to a currently controlled computer and which exceeds a threshold position. This helps to prevent a different computer being accidentally selected if a user unintentionally 'overshoots' onto the display of a different computer by a small amount.

According to a further aspect of the invention, there is provided a computer system comprising: a device according to any of the device aspects of the invention; a plurality of computers each having a respective display device, wherein each computer is in communication with a respective output of the device; and a pointing device in communication with the input of the device.

The computer system can further comprise: a keyboard in communication with the input of the device.

A further aspect of the invention provides a method for sharing a pointing input device between a plurality of computers each having a respective display device, comprising: receiving relative pointer position data from the pointing input device and converting the relative pointer position data to absolute pointer position data; determining which of the plurality of computers to route input data to based on the absolute pointer position data; and routing input data to the determined one of the plurality of computers so that a cursor position on a display device of the determined one of the plurality of computers can be controlled by the pointing input device.

A further aspect of the invention provides a storage device or memory storing instructions executable by a data processing device to carry out any of the method aspects of the invention.

A further aspect of the invention provides switching apparatus for automatically sharing a pointing input device between a plurality of computers. The switching apparatus can comprise an input for receiving relative pointer position data from the pointing input device; a plurality of outputs, each connectable to a respective one of a plurality of computers to supply input data to a one of the plurality of computers; a plurality of video inputs, each connectable to a one of the plurality of computers to receive video input from a respective one of the computers; video combining hardware configured to combine video input received from the plurality of computers into a single video signal for output to a display device; a video output for outputting the single video signal to the display device; and a controller, the controller configured to: receive from the input relative position data from the pointing device and convert the relative pointer position data to absolute pointer position data; determine which of the plurality of computers to route input data to based on the absolute pointer position data; and route input data to the determined one of the plurality of computers so that a cursor position on a portion of a screen of the display device corresponding to the determined one of the plurality of computers can be controlled by the pointing input device.

Preferred features of the first aspect of the invention can also be preferred aspects of this switching apparatus aspect of the invention.

The switching apparatus can be provided as a single switching device.

The switching apparatus can be provided as a switching device and a separate video combining device.

A further aspect of the invention provides a computer system comprising: any of the switching apparatus aspects of the invention mentioned above; a plurality of computers, wherein each computer is in communication with a respective output of the switching apparatus; at least one display device in communication with the video output of the switching apparatus; and a pointing device in communication with the input of the switching apparatus.

The computer system can further comprise: a keyboard in communication with the input of the switching apparatus.

The computer system can further comprise a further display device. The switching apparatus can include a further video output. The video combining hardware can be further configured to combine video input received from a further plurality of the computers into a further single video signal for output to the further display device which is in communication with the further video output.

A yet further aspect of the invention provides a method for sharing a pointing input device between a plurality of computers having a display device displaying video output from at least two of the plurality of computers at the same time, comprising: receiving video input from at least two of the plurality of computers, combining the video input into a single video output signal and outputting the single video output signal to a display device to display video output from the at least two computers in different portions of a screen of the display device at the same time; receiving relative pointer position data from the pointing input device and converting the relative pointer position data to absolute pointer position data; determining which of the plurality of computers to route input data to based on the absolute pointer position data; and routing input data to the determined one of the plurality of computers so that a cursor position on a portion of the screen of the display device corresponding to the determined one of the plurality of computers can be controlled by the pointing input device.

A yet further aspect of the invention provides a storage device storing instructions executable by a data processing device to carry out the method of the yet further aspect of the invention.

BRIEF DESCRIPTION OF THE DRAWINGS

Embodiments of the invention will now be described in detail, and by way of example only, with reference to the accompanying drawings, in which.

DETAILED DESCRIPTION OF EMBODIMENTS OF THE INVENTION

In the Figures, like items share common reference numerals unless indicated otherwise. It will be appreciated that the described embodiments are by way of example only and a number of the features of the invention, such as, for example, the number of computers and number and type of input devices, can be varied without departing from the invention. Before describing the embodiments in detail some of the underlying considerations relating to the invention and more general properties of the invention will be described and explained.

Many pointing input devices, such as personal computer mice, usually only send information about their movements relative to their last position. Although, in theory, these relative movements could be summed to indicate an absolute mouse position, in practice it may not be possible to determine the absolute pointer position only from relative mouse data that is sent to a computer. The reason for this is that computers implement different mouse speed/scaling and acceleration schemes which means that there may be no direct relationship between any relative mouse data sent to the computer and the absolute pointer position on the screen. The situation is further complicated because the mouse pointer position can be moved by the computer independently of the mouse. Therefore, if relative mouse movement data is sent to the computer, there is no practical way of calculating the mouse pointer position based on this data alone.

To overcome this problem, the device of the invention sends pointer position data as absolute pointer data. This is possible because many computers, for example, those with USB interfaces, will also accept pointer information from graphics tablets and touch screen devices. Devices such as graphics tablets present their pointer information as absolute pointer data referenced to a fixed origin. If absolute pointer data is sent to the computer then the position of the mouse pointer can be reliably determined. This enables a switching strategy based on the pointer position to be practically implemented because the device is able to reliably determine the position of the mouse pointer simply by tracking the data that it has sent to the computer.

However, standard PC style mice only usually send relative mouse movement data that contains information about the horizontal and vertical change in position since the previous movement report. To overcome this problem, the invention performs a conversion from relative pointer data to absolute pointer data. It does this by storing the current absolute coordinates in memory and adding relative mouse movement information to create a new absolute mouse position. This new absolute position is then reported to the computer.

By supplying the mouse movement information to the computer as absolute pointer data rather than relative pointer data, any mouse acceleration and scaling settings that have been selected on the computer do not have any effect upon the action of the mouse. Different users prefer different mouse acceleration and scaling schemes and so it is preferable not to remove this functionality for the user. To resolve this problem, the invention enables the user to select various mouse scaling (speed) and acceleration schemes. The user's choice affects the way that the conversion from relative to absolute data is handled within the device. Sufficient mouse accelerating and scaling schemes are provided to enable the user to achieve a similar mouse action to that which would have occurred if relative pointer data had been sent to the computer.

Figure 2:
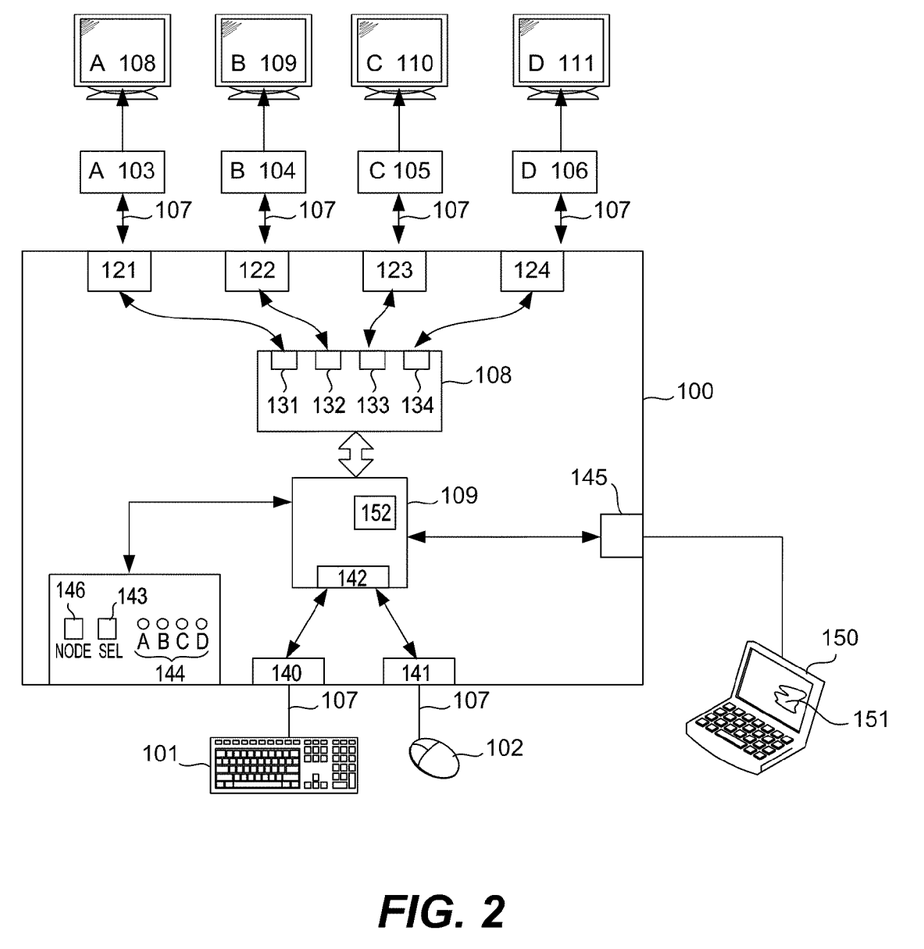
FIG. 2 shows a schematic block diagram of a computer system according to a first embodiment of the invention and including a device according to a first embodiment of the invention.

FIG. 2 shows a schematic block diagram of computer system according to the invention and including a device 100 according to a first embodiment of the invention which will be referred to herein as a four way HID Switch and which is designed for sharing a keyboard (101) and mouse (102) between four computers (103 to 106) that are each driving their own respective displays (108 to 111). The keyboard, mouse and computers are connected to the switch device 100 via respective USB cables (107). The switch device includes a controller which controls its operation and which can be implemented in practice using a number of electronic data processing devices and circuits. The HID switch device (100) has four USB computer interfaces (121-124) providing an output from the device and that are each connected to a respective serial interface engine (131-134) that are instantiated within an FPGA (108). These serial interface engines deal with the low level USB communications between the HID Switch and the computers. A microprocessor (109) is in communication with the FPGA and is able to read and write data to and from the serial interface engines. The microprocessor is sufficiently fast that it is able to emulate the presence of a keyboard, mouse and graphics tablet to each of the computers simultaneously by sending and receiving appropriate data.

The microprocessor (109) is in communication with USB peripheral interfaces (140, 141) that provide an input to the device and that are connected to the keyboard and mouse respectively. The microprocessor contains an integrated USB host controller circuit (142) that enables it to communicate with the keyboard and mouse. The microprocessor is also in communication with two key switches (143, 146), a display (144) and a serial port (145).

A mode selector key (146) is provided that can be used to select the operating mode of the HID Switch. The user can select either a manual mode or a span mode. In manual mode, the switch operates in a similar way to existing KM switches. A channel selector key (143), or keyboard hotkey combinations, can be used to select a computer (A to D) and the keyboard and mouse signals received from the keyboard and mouse (101, 102) are routed by the microprocessor (109) to a selected one of the serial interface engines (131 to 134). In this way the user can control a selected one of the computers. In manual mode, the mouse data may be sent to the computer as either relative or absolute pointer data, according to how the user has chosen to configure the operation of the HID Switch. This choice is available because the switch declares itself to each computer in such as way that the computer believes that it is connected to three devices, namely a keyboard, a mouse and a graphics tablet, or some other input device which can output absolute pointer position data. The mouse pointer data will only ever be delivered by the device in either mouse (relative) or tablet (absolute) format, never both at the same time. In manual mode, no automated switching based on the position of the mouse pointer occurs.

Span mode is selected using the mode selector key (146) or a keyboard hotkey combination. In span mode the routing of the keyboard and mouse data is determined by the position of the mouse on the screen of the computer being controlled. In order to use span mode, the user initially configures the HID Switch (100) by connecting a computer (150) to the serial port (145) and running a configuration software program (151) that is supplied for the purpose. Using the configuration software program, the user can define how they wish the switching to occur when they move the mouse pointer to the edge of the screen.

Figure 3:
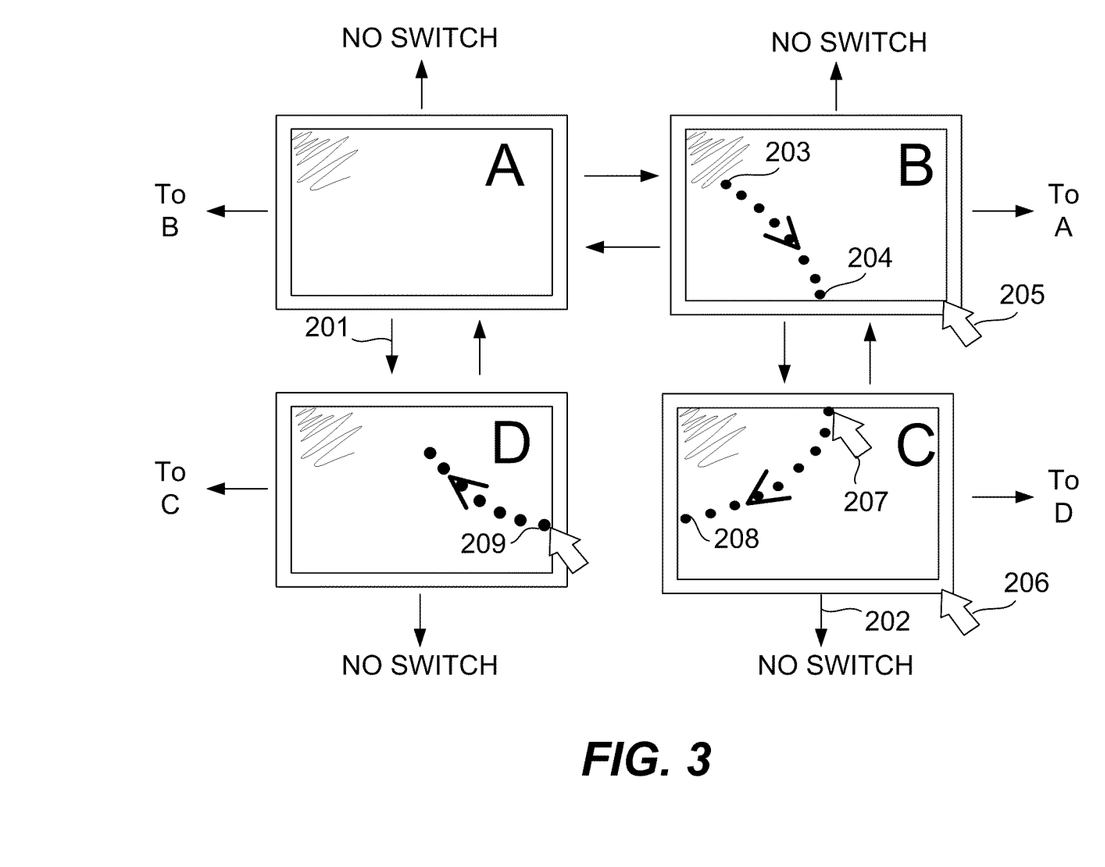
FIG. 3 shows a schematic diagram of four display devices and illustrating the operation of the invention.

FIG. 3 illustrates one possible switching arrangement for four screens (108, 109, 110, 111) that are placed together in a square. In this example, each screen is connected to a separate respective computer (102, 104, 105, 106). The configuration program (151) enables the user to specify that the keyboard and mouse will be switched to computer D (106) if the mouse pointer is dragged (as illustrated by arrow 201) across the bottom edge of screen A (108). The user can also define instances where they do not wish any switching to occur. In the example illustrated in FIG. 3, no switching will occur if the mouse pointer is dragged to the bottom edge of screen C (as illustrated by arrow 202). The arrows between the four screens shown in FIG. 3 indicate one possible switching arrangement that the user could select.

To avoid unwanted switching being triggered at the edges of a screen, the HID switch can be configured to only switch once it has received a defined level of mouse movement data that would have caused the mouse pointer to move a defined distance beyond the edge of the screen if it had not otherwise been constrained to remain within the screen. The size of this "buffer zone" or threshold level of movement may also be configured by the user using the software program (151).

The configuration program also enables the user to select the mouse acceleration and scaling scheme that they would like to implement. Different acceleration and scaling settings may be selected for each computer, although most users would normally be expected to select the same scheme for all computers. The configuration that has been selected by the user is stored in memory within the microprocessor (152).

In span mode, the microprocessor (109) receives relative pointer data from the mouse (102) and converts this to absolute pointer data by keeping track of the current pointer position in memory (152). In order to perform the conversion, the microprocessor stores a series of several previous relative mouse movements and processes these together with new mouse movement information to know how the new relative mouse movement information should be made to change the absolute pointer position. The change in absolute pointer position will be affected by the acceleration and scaling settings that the user has selected. By analysing a series of relative mouse movements a mouse acceleration scheme can be implemented. The microprocessor stores the current absolute pointer position for each of the computers (103-106) that are connected.

Once the microprocessor (109) has effected the conversion from relative pointer data to absolute pointer data, the new absolute pointer position is communicated to the selected computer via the relevant serial interface engine (131-134). The selected computer will see an instruction from a tablet device commanding it to move its pointer to a defined X/Y position relative to a fixed origin point.

If the microprocessor detects that the mouse pointer has reached the edge of the screen then it checks its configuration memory (stored in 152) to check whether the conditions for a switching event have been triggered. If they have then the microprocessor sends an instruction to the old computer to move its pointer to the bottom right hand side of the screen which effectively makes the mouse pointer disappear on that screen. The microprocessor then sends an instruction to the new computer to move its pointer to a position on the screen that corresponds with the required screen entry position. FIG. 3 illustrates this process graphically.

Starting from point 203, the user moves the mouse so as to make the mouse pointer move along the dotted path in the direction shown by the arrow. When the mouse pointer reaches point 204, the microprocessor checks its configuration and sees that it needs to make a switch to computer C once a small amount of additional downward mouse data has been detected. Once this occurs the microprocessor sends an instruction to computer B to move its pointer to the bottom right of the screen (205). It then sends an instruction to computer C to move its pointer from the bottom right hand side, where it had been previously parked (206), to the required entry point of screen C (207). In this case the required entry point (207) matches the same horizontal position as the exit point from screen B (204). The microprocessor then routes all subsequent keyboard and mouse input data to computer C which is driving screen C.

Keyboard and mouse input data continues to be routed to computer C until the mouse pointer reaches point 208. Again the microprocessor checks its configuration and sees that it needs to make a switch to computer D once a small amount of additional leftwards mouse data exceeding a threshold value has been detected. Once this occurs the microprocessor sends an instruction to computer C to move its pointer to the bottom right of the screen (206). It then sends an instruction to computer D to move its pointer from the bottom right hand side, where it had been previously parked, to the required entry point of screen D (209). In this case the required entry point (209) matches the same vertical position as the exit point from screen C (208). The microprocessor then routes all subsequent keyboard and mouse data to computer D which is driving screen D.

It can be seen that this process enables the user to move the mouse across all the four screens as if they were one large screen being driven from a single computer. The switching time of the HID Switch 100 is sufficiently quick to effect a smooth and graceful transition from screen to screen.

As discussed above, in span mode the microprocessor (109) receives relative pointer data from the mouse (102) and converts this to absolute pointer data by keeping track of the current pointer position in memory (152). In order to perform the conversion, the microprocessor processes the relative X and Y data according to any acceleration and scaling options that have been selected by the user and then uses this processed X and Y data to change the absolute position of the mouse pointer. Various different acceleration schemes are possible, some of which involve analysing a series of relative mouse movements. A preferred acceleration scheme involves processing each relative mouse movement separately using a lookup table to map the relative X and Y data to accelerated X and Y data. Changing the values in the lookup table changes the acceleration scheme. Any required scaling can then be applied to this data by multiplying by a scaling factor.

Figure 4:
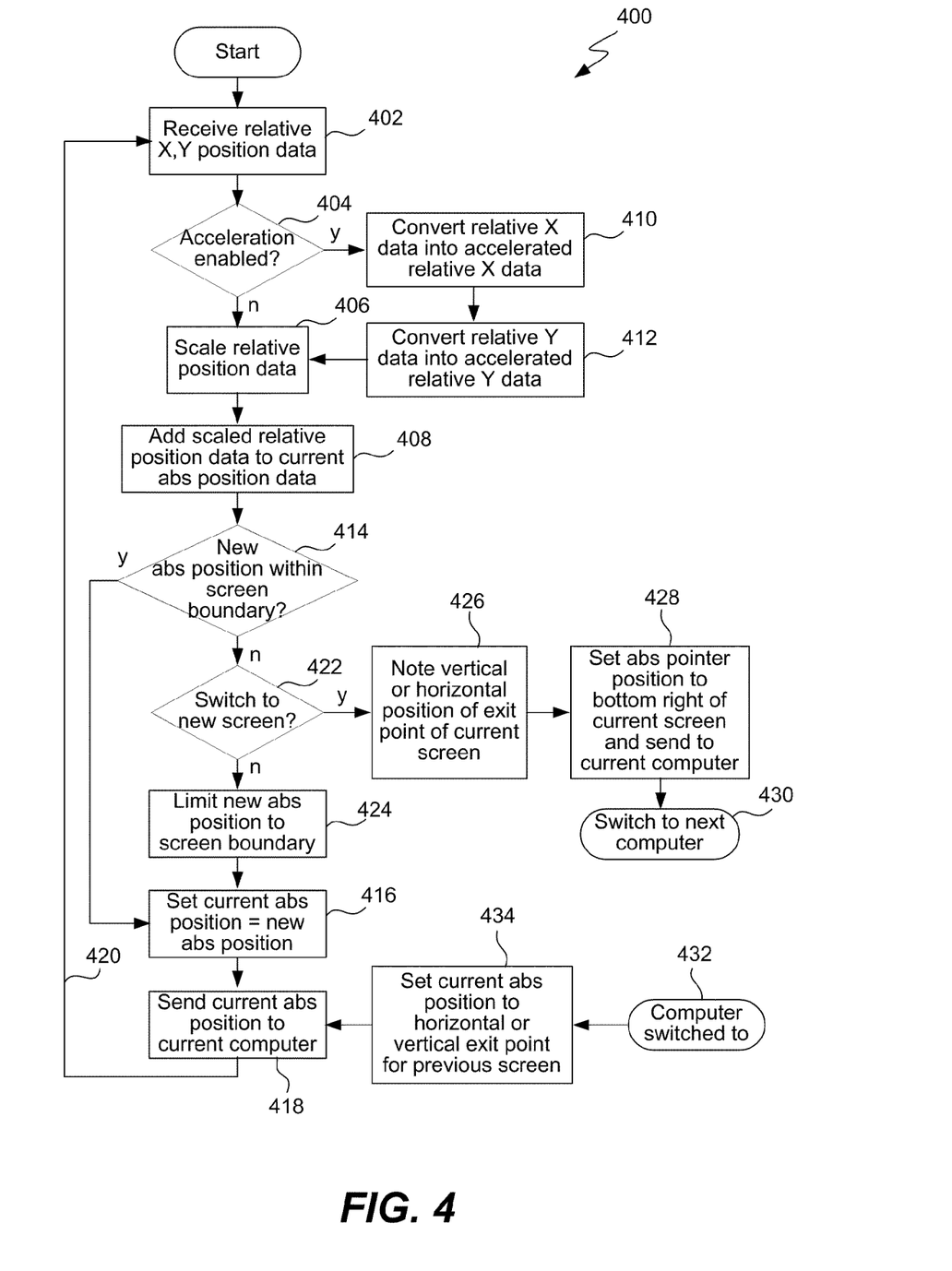
FIG. 4 shows a flow chart illustrating a data processing method according to the invention.

FIG. 4 shows a flow chart further illustrating the data processing method 400 of the invention to convert relative pointer position data, e.g. from a mouse, into absolute pointer position data for a one of the computers (103, 104, 105, 106). The microprocessor stores, or has access to, the current absolute pointer position for each of the computers (103-106) that are connected to the switching device 100.

Referring to FIG. 4, relative X,Y position data (RX, RY) is received by the microprocessor from the mouse at step 402. At step 404, it is determined whether acceleration has been selected by the user and is enabled for the pointing device. If not, then processing proceeds to step 406 at which any required scaling is applied by multiplying the relative X data (RX) and relative Y data (RY) by a scaling factor S to create scaled relative X and Y pointer position data (SRX, SRY). Alternatively, if it is determined at step 404 that acceleration is enabled then the relative X and Y data (RX, RY) is processed at steps 410 and 412 to create accelerated relative X and Y pointer position data (ARX, ARY).

The acceleration scheme illustrated in FIG. 4 uses lookup tables to determine the accelerated relative data. At step 410, the relative X data (RX) is used to index a value in a lookup table to determine the accelerated relative X data (ARX). At step 412, the relative Y data (RY) is used to index a value in a lookup table to determine the accelerated relative Y data (ARY). The lookup table that is used depends upon the acceleration scheme that has been selected by the user.

There are various ways in which a look up table can be used to implement different acceleration schemes. In one embodiment, values are stored in the lookup table that are a multiple of the relative value that is used to index the table. For example a relative value of 1 can be associated with a value of 15, a relative value of 10 may be associated with a value of 150, and a relative value of 100 may be associated with a value of 1500. By weighting the multiplication factor of the larger values more heavily, an accelerated mouse movement can be created whereby small mouse movements are very controllable and precise but large mouse movements allow the mouse to move across the screen quickly. In another embodiment, for example, a relative value of 1 may be associated with a value of 15, 10 a value of 200, and 100 a value of 3000. Other acceleration schemes may be implemented similarly by associating the relative values used to index the table with other acceleration multipliers or factors.

Any required scaling is then applied to the XY data at step 406 by multiplying by a scaling factor S to get scaled accelerated relative XY data (SARX, SARY). Depending on whether acceleration has been selected or not, the scaled relative XY data (SRX, SRY) or the scaled accelerated relative XY data (SARX, SARY) is then added at step 408 to the current absolute pointer position to create a new absolute pointer position.

The switch device 100 declares a pointing device to each computer, and provides each computer with a maximum X and Y deflection value (Xmax, Ymax) within a switching device descriptor that describes the characteristics of the absolute pointing device. These maximum deflection values are then used by the computer operating system to determine where to place the pointer relative to the edges of the computer's screen. For example, an absolute pointer position defined by coordinates X=Xmax/2, Y=Ymax/2 would place the pointer in the centre of the screen. To some extent the Xmax and Ymax values are therefore arbitrary, although they should be sufficiently large to ensure reasonable precision of pointer positioning. For typical computers, suitable precision may be achieved using 16-bit values of Xmax and Ymax.

At step 414 it is determined whether the new absolute pointer position falls outside the screen boundary (i.e., is less than 0 or greater than Xmax or Ymax) or not. If the new absolute pointer position not within the screen boundary for the current computer and screen, then this may be a trigger to switch the mouse movement to the next computer. If it is determined at step 414 that the new absolute pointer position is within the current screen boundary, then processing proceeds to step 416 at which the current absolute position of the pointer to be displayed is set to be the newly determine absolute position, and then the current absolute position is reported to the current computer at step 418. The microprocessor sends an absolute pointer position report to the currently selected computer (A, B, C or D) to move the pointer to the current absolute XY position as determined by the current absolute pointer position for that computer that is stored in its memory. Further relative position data can then be received from the mouse at step 402 and the process repeats.

If at step 414 it is determined that the new absolute position is not within the current screen boundary, then processing proceeds to step 422 at which a determination is made whether the absolute pointer position indicates that a new screen and computer should be switched to. At step 422, the microprocessor checks the configuration that has been selected by the user, if no switching action is to be triggered (for example, because the absolute pointer position corresponds to the top edge of screen A 108), then at step 424, the microprocessor limits the new absolute pointer position to be within the boundary of the current screen. More specifically, the new absolute X mouse position is limited to be within the range 0 to Xmax and the new absolute Y mouse position is limited to be within the range 0 and Ymax. Processing then proceeds to steps 416 and 418 as described above.

Alternatively, if at step 422 the processor determines from the configuration that a switch to a next or new one of the computers and screens is required, then the relevant horizontal or vertical exit position for the current screen is determined and stored at step 426. For example, if the currently selected computer is computer A and the configuration indicates that a switchover to computer B should occur when the pointer is dragged over the right hand edge of computer A's screen (as illustrated in FIG. 3), then the Y coordinate of the exit position (Yexit) is stored. If the pointer is half way up the screen at the point of exit then the value of Yexit would be Ymax/2.

Before switching to the next computer, at step 428 the microprocessor sends a command to the currently selected computer to move the pointer position to the bottom right hand side of the screen. For example, this can be achieved by setting the absolute pointer position to X=Xmax, Y=0 and sending these values to the current computer at step 428. Then at step 430, the device 100 switches over to the next computer (in this example computer B 104 having associated and screen B 109) and any keyboard and mouse action is then reported to the next computer, and processed using the same method 400 as illustrated by FIG. 4. Although this gives the user the impression that they keyboard and mouse have been "switched" to the next computer, the microprocessor 109 is simply addressing its keyboard keystroke and mouse position reports to another one of the computers (103 to 106) via the FPGA (108). Hence, a process generally the same as process 400 is carried out for each computer as each of the computers is selected dependent on the absolute mouse position.

If USB input devices are used, such as USB keyboards and mice, then the device 100 can be configured so that the computers do not see a USB device disconnect event. The switch 100 is configured to constantly emulate the presence of the keyboard and mouse to all the computers. How to achieve constant emulation is generally known to a person of ordinary skill in the art. Doing so is useful because re-enumeration of USB devices at every switchover would make the action of the switching device 100 too slow to be of practical use in span mode.

After step 430, no further keyboard keystroke or mouse movement reports are sent to the current computer until the current computer (in this example, computer A) is next selected by the processor at step 432. The microprocessor then calculates the required pointer position using the relevant value that has been stored at a step corresponding to step 426 for the previously selected computer just before the switchover occurred. For example, if computer B's screen is placed to the right of computer A's screen (as illustrated in FIG. 3) and where the switch 100 is configured to trigger a switchover to computer A when the pointer is moved across the left hand edge of computer B's screen, then as the pointer moves across the left hand edge of computer B's screen, the microprocessor will store the vertical exit point (Yexit) in step 426 of the process 400 being carried out for computer B. At switchover 432 to computer A, the microprocessor then sets the current absolute XY pointer position for computer A to be at coordinates X=Xmax, Y=Yexit in step 434. In this way the pointer will appear to flow across the screens from computer B's screen to computer A's screen. Processing then continues as described above with process flow returning 420 to step 402 to receive relative position data at step 402.

In the above example, the switchover between computers A and B occurred on the left hand edge of computer B's screen and a vertical exit point was stored (Yexit). If the screens are placed one on top of one another (e.g. screens A and C in FIG. 3), and the switchover is configured to occur at the bottom of the screen rather than at the side of the screen, it will be appreciated that a horizontal exit point would be used (Xexit) so that the horizontal exit point of the previous screen would match the horizontal entry point of the new screen.

For simplicity of explanation, the flow chart shown in FIG. 4 assumes that no buffer zone has been selected. A buffer zone feature can be implemented by configuring the switch 100 so that the switch will only trigger a switchover once it has received a defined level of pointer movement data that would have caused the mouse pointer to move a defined distance beyond the edge of the screen if it had not otherwise been constrained to remain within the screen. This optional enhancement can be included in the functionality of the switch by storing the mouse pointer's position in an imaginary buffer zone around the real boundary of the screen whilst constraining the mouse pointer position reports that are sent to the computer to be within the real boundaries (i.e. between 0 and Xmax and between 0 and Ymax) of the screen.

It will be appreciated by those skilled in the art that the microprocessor (109) and FPGA (108) implement several different logical functions that are supported in order to successfully support span mode operation and control the switching device 100. As described above a processing function converts relative pointer data into absolute pointer data and a routing control function uses the absolute pointer position and other mouse movement data to determine if the keyboard and mouse input data should be routed to another computer. A routing function then routes the keyboard and mouse data to the currently selected computer.

In one embodiment, the microprocessor can be implemented using an LPC2468 provided by NXP and the FPGA can be implemented using an XC3S250E provided by Xilinx.

As well as controlling a plurality of computers displaying video on multiple display devices, the invention can also be used to control a plurality of computers displaying video on a single display device or displaying video on a lesser number of display devices than the number of computers.

Figure 5:
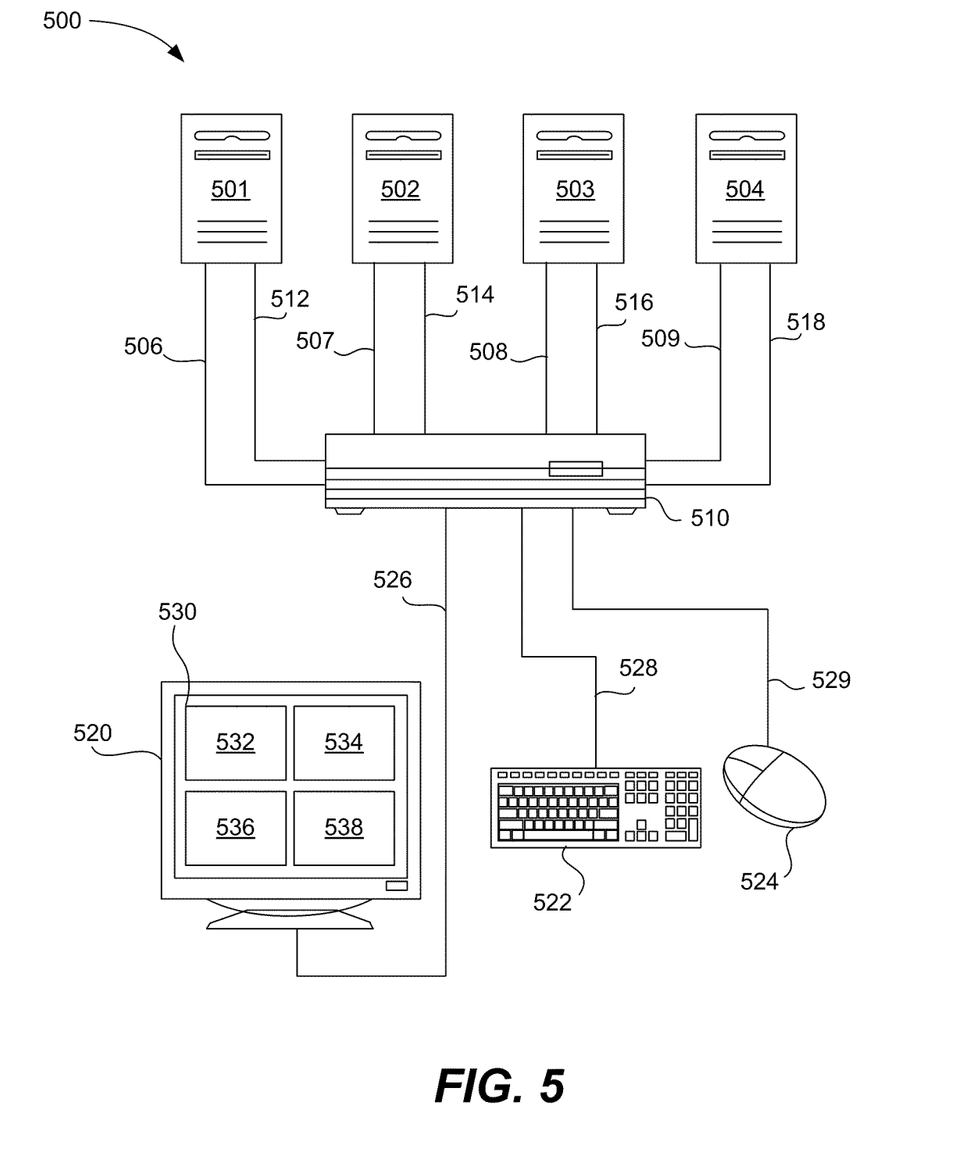
FIG. 5 shows a schematic block diagram of a computer system according to a second embodiment of the invention and including switching apparatus according to a second embodiment of the invention.

FIG. 5 shows a schematic block diagram of a computer system 500 according to a further embodiment of the invention and including a switching apparatus 510 according to a second embodiment of the invention. As shown in FIG. 5, the computer system 500 includes four computers 501, 502, 503, 504, a switching apparatus 510 in the form of a single switching device, a single display device 520, a keyboard 522 and a mouse 524. Switching device 510 is similar to switching device 100 but also includes video combining hardware which combines video input from the separate computers 501, 502, 503, 504, and combines the separate video inputs into a single video output signal which is supplied to display device 520. Hardware to perform the video combination function on its own is generally known in the art. For example, video combining hardware is provided in the V-Switch quad device available from HETEC Datensysteme GmbH of Germany.

As illustrated in FIG. 5, the switching apparatus 510 is provided as a single device which includes both the video combining hardware and the switching hardware similar to the switch 100 of the first embodiment of the invention. In other embodiments of the invention, the computer system can include a separate video combiner device and a separate switching device. Also, in other embodiments, a greater or lesser number of computers can be provided. Further, in other embodiments a greater number of display devices can be provided, and the video combining hardware adapted accordingly, but the number of display devices is less than the number of computers in the system so that at least one of the display devices displays video from more than one computer at the same time.

Returning to FIG. 5, each computer 501, 502, 503, 504 is connected to the switching device 510 by a respective video cable 506, 507, 508, 509 so that the video output of each computer is supplied to a video input of the switching device 510. One or more cables over which keyboard and mouse data signals can be passed (represented by single cables 512, 514, 516, 518) are connected between each computer and the switching device. In one embodiment, each cable 512, 514, 516, 518 is a single USB cable connected between the switching device and a respective one of the computers.

Display device 520, for example a computer monitor, is connected to a video output of the switching device 510 by a video cable 526 which supplies a combined video signal to the display device to allow the video output of multiple of the computers to be displayed at the same time. For example, as illustrated in FIG. 5, the screen 530 of the display device 520 displays the video output from each of the four computers in a separate respective area 532, 534, 536, 538 or quadrant of the screen at the same time. In other embodiments, the video output of fewer than all of the computers is displayed on the monitor at the same time. For example, the video output of a selected two of the computers can be displayed on the display device at the same time.

The keyboard 522 is connected to a keyboard input of switching device 510, by a keyboard cable, such as a USB cable and mouse 524, or some other pointing device, is connected to a pointing device input by cable 529, which may be a USB cable in some embodiments.

The method of operation of the switching device 510 and computer system 500 is generally similar to that described above with reference to FIGS. 2, 3 and 4. The switching hardware described in connection with the first embodiment is equally suitable for the system illustrated in FIG. 5. In other words, in other words, the fact that the four video signals are combined for display on a single screen does not fundamentally change the operation of the switching hardware as described above. Video switching hardware and video combining hardware may be provided in separate units and used independently. However an advantage of providing the switching hardware and video combining hardware in the same unit 510 is that the same screen layout configuration information may be used to both define where the video output of each computer is placed on the combined screen and also drive the switching action of the switching hardware. For example, in the embodiment shown in FIG. 5, the switching hardware may be configures so that the mouse cursor flows onto screen area 534 after passing rightwards past the right hand edge of screen area 532. If the user chooses to re-configure the layout of the combined screen so that the display regions 532 and 534 are now swapped then the switching device 510 may use this same configuration data to re-arrange the switching boundaries so that the mouse cursor flows onto screen area 532 after passing rightwards past the right hand edge of screen area 534.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A switching device for automatically sharing a pointing input device between a plurality of computers, comprising:
    an input for receiving relative pointer position data from the pointing input device;
    a plurality of outputs, each connectable to a respective one of a plurality of computers to supply input data to a one of the plurality of computers; and
    a controller, the controller configured to:
        declare an absolute pointing device to each of the plurality of computers and provide each of the plurality of computers with a maximum x deflection absolute value and a maximum y deflection absolute value of the pointer device;
        receive from the input relative pointer x and y position data from the pointing device and convert the relative pointer position data to absolute pointer position data;
        determine which of the plurality of computers to route input data to based on the absolute pointer x position data being less than zero or greater than the maximum x deflection absolute value or the absolute pointer y position data compared to the maximum y deflection absolute value of the absolute pointing device; and
        route input data to the determined one of the plurality of computers so that a cursor position on a display device of the determined one of the plurality of computers can be controlled by the pointing input device.

2. The device of claim 1, wherein the absolute pointer position data is referenced to a fixed origin.

3. The device as claimed in claim 1, wherein each of the plurality of outputs is a USB interface and the input comprises at least one of a USB interface and another interface.

4. The switching device of claim 3, wherein the switching device is further configured to:
    constantly emulate the presence of a USB keyboard and a USB mouse to all of the plurality of computers.

5. The switching device of claim 3, wherein the controller is further configured to:
    declare itself to each of the plurality of computers in such a way that each of the plurality of computers believes that it is connected to a keyboard, a mouse and the absolute pointing device.

6. The device as claimed in claim 1, wherein the pointing input device is a mouse.

7. The device as claimed in claim 6, wherein the controller is further configured to use at least one of pointer scaling data and pointer acceleration data in converting the relative pointer position data to the absolute pointer position data so as to mimic the pointer action on a display device that would have occurred if the input data had been applied to the computer as relative mouse movement data.

8. The device as claimed in claim 1, wherein the input can also receive keyboard input data and wherein the controller is further configured to route keyboard input data as input data to the determined one of the computers at the same time as input data from the pointing device.

9. The device as claimed in claim 1, wherein the controller is further configured to determine which of the plurality of computers to route input data to based on whether the absolute pointer position data corresponds to a pointer position on a display device of a computer different to a currently controlled computer.

10. The device of claim 9, wherein controller is further configured to determine which of the plurality of computers to route input data to based on whether the absolute pointer position data corresponds to a pointer position on a display device of a computer different to a currently controlled computer which exceeds a threshold position.

11. A computer system comprising:
    a device as claimed in claim 1;
    a plurality of computers each having a respective display device, wherein each computer is in communication with a respective output of the device; and
    a pointing device in communication with the input of the device.

12. The computer system of claim 11, further comprising:
a keyboard in communication with the input of the device.

13. The switching device of claim 1, wherein the maximum x deflection value and the maximum y deflection value are 16-bit values.

14. The switching device of claim 1, wherein the controller is further configured to declare the maximum x-deflection value and maximum y-deflection to each of the plurality of computers over respective USB connections.

15. The switching device of claim 1, wherein the controller is further configured to:
instruct a first computer of the plurality of computers to move a pointer displayed on a screen of a first display device to a position which effectively makes the pointer disappear on the screen of the first display device when it is determined to route input data to a second computer of the plurality of computers.

16. The switching device of claim 15, wherein the controller is further configured to:
instruct the second computer to move a pointer displayed on a screen of a second display device to an entry position on the screen of the second display device which matches an exit position of the screen of the first display device so that the pointer appears to flow across the screens of the first and second display devices.

17. The switching device of claim 1, further including a port by which the switching device can be configured by a user using a configuration software program to define how to determine which of the plurality of computers to route data to.

18. The switching device of claim 1, further including a port by which the switching device can be configured by a user using a configuration software program to select an acceleration and scaling scheme that the switching device should implement.

19. The switching device of claim 1, wherein the controller is further configured to:
convert the relative pointer x and y position data to absolute pointer x and y position data by multiplying the relative pointer x and y position data by a scaling factor to implement a mouse speed scheme.

20. The switching device of claim 19, wherein the controller is further configured to:
convert the relative pointer x and y position data to absolute pointer x and y position data by adding the scaled relative pointer x and y position data to a current absolute pointer x and y position data to create a new absolute pointer x and y position.

21. The switching device of claim 20, wherein the controller is further configured to:
convert the relative pointer x and y position data to absolute pointer x and y position data by converting the relative pointer x and y position data to create accelerated relative pointer x and y position data to implement a pointer acceleration scheme before multiplying the relative pointer x and y position data by the scaling factor.

22. The switching device of claim 1, wherein:
said determining which of the plurality of computers to route input data to, based on the absolute pointer, is done in the absence of resolution data concerning the determined one of the plurality of computers.

23. A method for sharing a pointing input device between a plurality of computers each having a respective display device, comprising:
declaring an absolute pointing device to each of the plurality of computers and providing each of the plurality of computers with a maximum x deflection absolute value and a maximum y deflection absolute value of the pointer device;
receiving relative pointer x and y position data from the pointing input device and converting the relative pointer position data to absolute pointer position data;
determining which of the plurality of computers to route input data to based on the absolute pointer x position data being less than zero or greater than the maximum x deflection absolute value or the absolute pointer y position data being less than zero or greater than the maximum y deflection absolute value of the absolute pointing device; and
routing input data to the determined one of the plurality of computers so that a cursor position on a display device of the determined one of the plurality of computers can be controlled by the pointing input device.

24. A storage device storing instructions executable by a data processing device to carry out the method of claim 23.

25. Switching apparatus for automatically sharing a pointing input device between a plurality of computers, comprising:
an input for receiving relative pointer position data from the pointing input device;
a plurality of outputs, each connectable to a respective one of a plurality of computers to supply input data to a one of the plurality of computers;
a plurality of video inputs, each connectable to a one of the plurality of computers to receive video input from a respective one of the computers;
video combining hardware configured to combine video input received from the plurality of computers into a single video signal for output to a display device;
a video output for outputting the single video signal to the display device; and
a controller, the controller configured to:
declare an absolute pointing device to each of the plurality of computers and provide each of the plurality of computers with a maximum x deflection absolute value and a maximum y deflection absolute value of the pointer device;
receive from the input relative pointer x and y position data from the pointing device and convert the relative pointer position data to absolute pointer position data;
determine which of the plurality of computers to route input data to based on the absolute pointer x position data being less than zero or greater than the maximum x deflection absolute value or the absolute pointer y position data being less than zero or greater than the maximum y deflection absolute value of the absolute pointing device; and
route input data to the determined one of the plurality of computers so that a cursor position on a portion of a screen of the display device corresponding to the determined one of the plurality of computers can be controlled by the pointing input device.

26. Switching apparatus as claimed in claim 25, wherein the switching apparatus is provided as a single switching device.

27. Switching apparatus as claimed in claim 25, wherein the switching apparatus is provided as a switching device and a separate video combining device.

28. A computer system comprising:
switching apparatus as claimed in claim 25;
a plurality of computers, wherein each computer is in communication with a respective output of the switching apparatus;
at least one display device in communication with the video output of the switching apparatus and a pointing device in communication with the input of the switching apparatus.

29. The computer system of claim 28, further comprising: a keyboard in communication with the input of the switching apparatus.

30. A method for sharing a pointing input device between a plurality of computers having a display device displaying video output from at least two of the plurality of computers at the same time, comprising:
receiving video input from at least two of the plurality of computers, combining the video input into a single video output signal and outputting the single video output signal to a display device to display video output from the at least two computers in different portions of a screen of the display device at the same time;
declaring an absolute pointing device to each of the plurality of computers and providing each of the plurality of computers with a maximum x deflection absolute value and a maximum y deflection absolute value of the pointer device;
receiving relative pointer x and y position data from the pointing input device and converting the relative pointer position data to absolute pointer position data;
declaring to each of the plurality of computers a maximum x deflection value and a maximum y deflection value;
determining which of the plurality of computers to route input data to based on the absolute pointer x position data being less than zero or greater than the maximum x deflection absolute value or the absolute pointer y position data being less than zero or greater than the maximum y deflection absolute value of the absolute pointing device; and
routing input data to the determined one of the plurality of computers so that a cursor position on a portion of the screen of the display device corresponding to the determined one of the plurality of computers can be controlled by the pointing input device.

31. A storage device storing instructions executable by a data processing device to carry out the method of claim 30.

32. A switching device for automatically sharing a pointing input device between a plurality of computers, comprising:
an input for receiving relative pointer position data from the pointing input device;
a plurality of outputs, each connectable to a respective one of a plurality of computers to supply input data to a one of the plurality of computers; and
a controller, the controller configured to:
declare an absolute pointing device to each of the plurality of computers and provide each of the plurality of computers with a maximum x deflection absolute value and a maximum y deflection absolute value of the pointer device;
receive from the input relative pointer x and y position data from the pointing device and convert the relative pointer position data to absolute pointer position data;
determine which of the plurality of computers to route input data to based on the absolute pointer x position data being less than zero or greater than the maximum x deflection absolute value or the absolute pointer y position data being less than zero or greater than the maximum y deflection absolute value of the absolute pointing device; and
route input data to the determined one of the plurality of computers so that a cursor position on a display device of the determined one of the plurality of computers can be controlled by the pointing input device.

* * * * *